Figure 8:
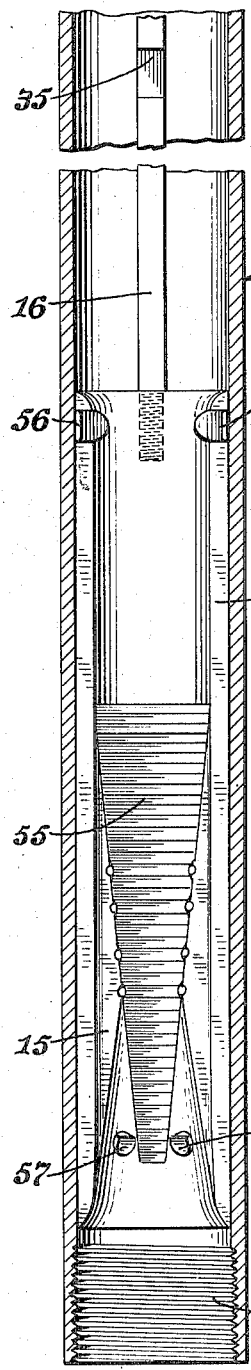

Aug. 3, 1937.                J. B. TUSTIN                2,088,883
                             FISHING TOOL
                         Filed Nov. 1, 1935           3 Sheets-Sheet 1
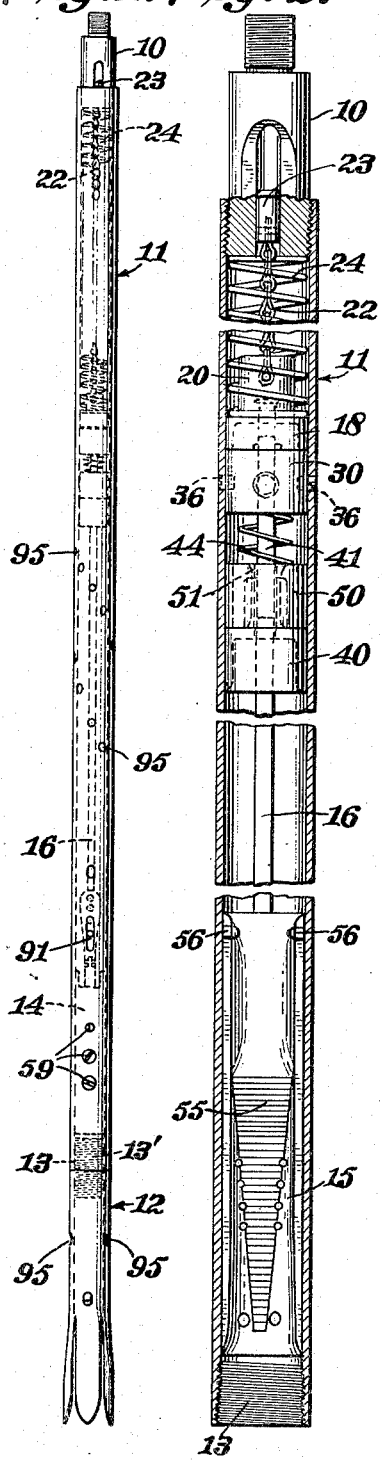
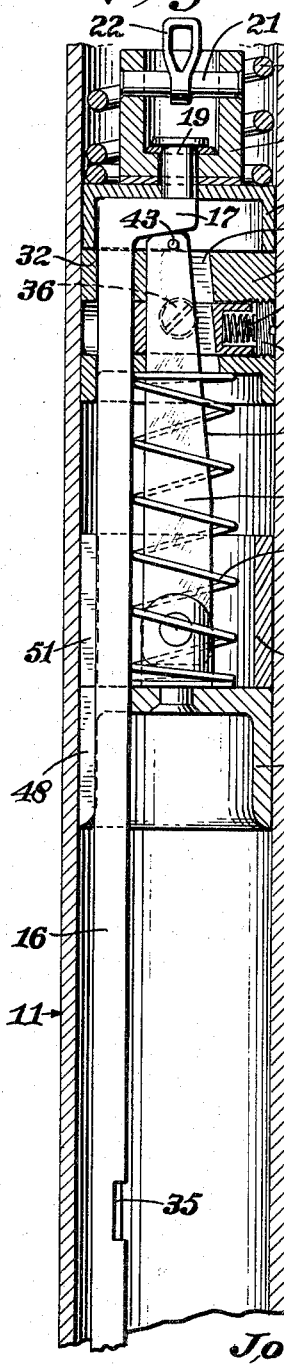
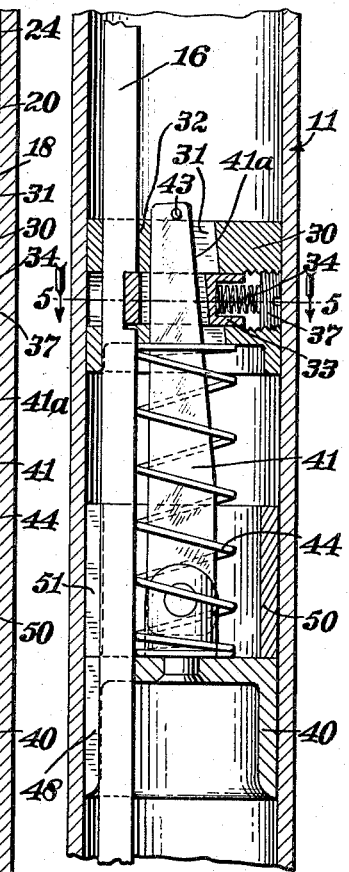
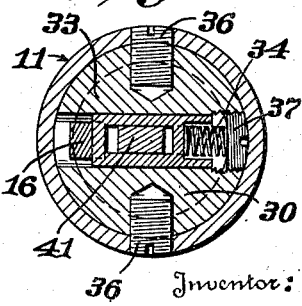
Inventor:
John B. Tustin,
By Samuel Lebowitz
            Attorney.

Aug. 3, 1937. J. B. TUSTIN 2,088,883
FISHING TOOL
Filed Nov. 1, 1935 3 Sheets-Sheet 2
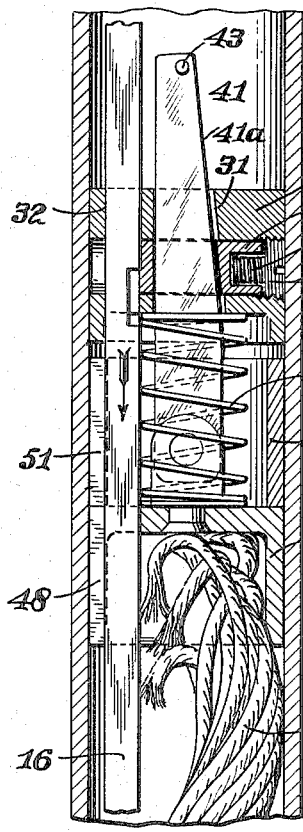
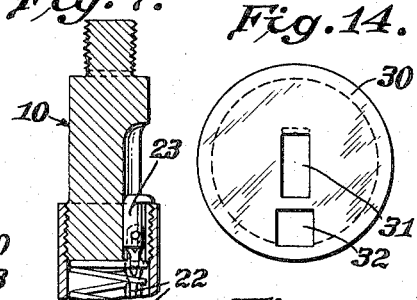
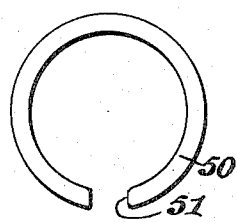
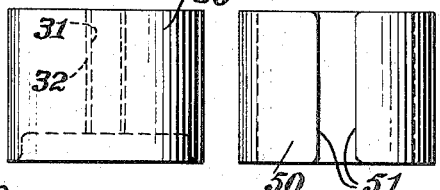
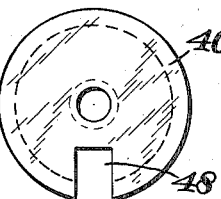
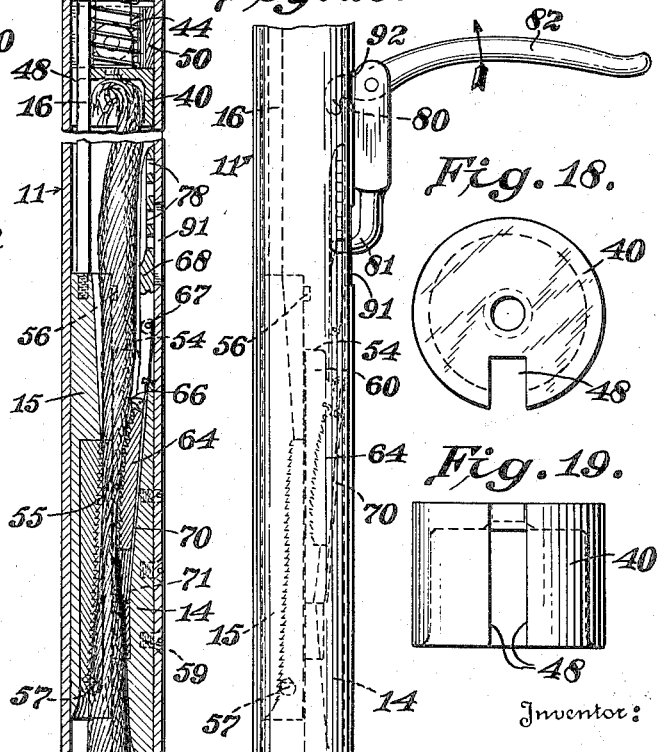
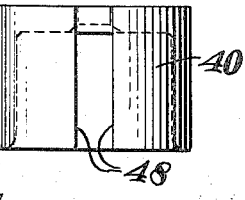
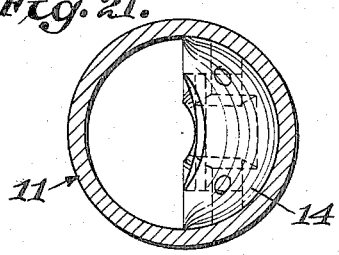
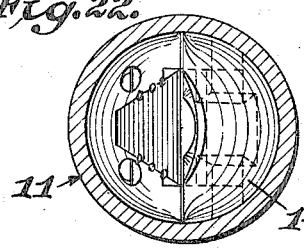
Inventor:
John B. Tustin,
Attorney.

Aug. 3, 1937.  J. B. TUSTIN  2,088,883
FISHING TOOL
Filed Nov. 1, 1935  3 Sheets-Sheet 3

Inventor:
John B. Tustin,
By Samuel Lebowitz
Attorney.

Patented Aug. 3, 1937

2,088,883

UNITED STATES PATENT OFFICE 2,088,883

FISHING TOOL

John B. Tustin, Harrisville, W. Va.

Application November 1, 1935, Serial No. 47,873

12 Claims. (Cl. 294—102)

This invention relates to fishing tools of the type employed for retrieving broken lines such as drill ropes or rods which are used in deep well operations.

It is the object of my invention to provide a tool which may be set for operation before it is lowered into the well and the operation of which is executed only when the object sought is encountered at such a position that a tight and effective hold thereon is obtained for withdrawal from the well.

It is a further object of my invention to provide a tool exercising a wedging operation for the purpose of effectively grabbing a broken line and to supplement such wedging operation by additional tightening at the start of the raising of the broken line to eliminate any possibilities of slippage of the broken line.

It is a further object of my invention to provide a novel and improved association between movable and stationary slip-wedge units in a fishing tool.

It is another object of my invention to present an improved stationary wedge unit assembly.

A still further object of the invention is to provide a tool of the type set forth, which is rugged in construction, economical to manufacture, and which is easy to operate.

With these and various other objects in view, the invention may consist of certain novel features of construction and operation, as will be more fully described and particularly pointed out in the specification, drawings and claims appended hereto.

Figure 9:
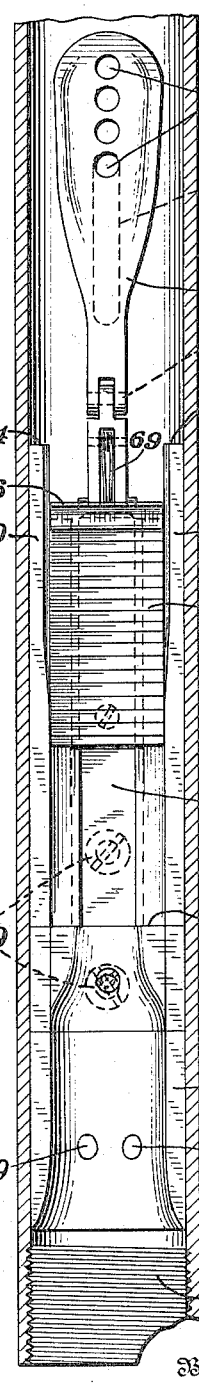
Figure 10:
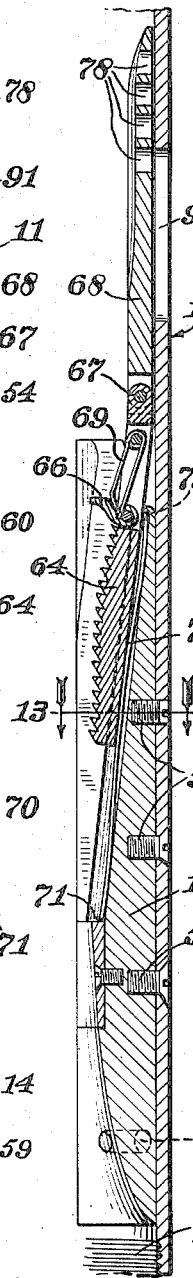

In the drawings:

Fig. 1 is a front elevation of the complete fishing tool,

Fig. 2 is a longitudinal sectional view of the socket in broken portions with certain parts in elevation, Fig. 3 is a longitudinal sectional view of the socket at the portion thereof in proximity to the latching collar, in the completely extended position of the actuating spring, Fig. 4 is a view corresponding to Fig. 3 showing the fishing tool in set position preparatory to its operation in the condition in which it is lowered in a well casing, Fig. 5 is a horizontal sectional view along 5—5 of Fig. 4, Fig. 6 is a longitudinal sectional view corresponding to Fig. 4 showing the positioning of the parts at the starting of movement of the control rod and movable slip-wedge for grabbing engagement of the broken drill rope, Fig. 7 is a longitudinal sectional view of the socket with certain portions broken therefrom showing the cooperation between the slip wedges at the time of engagement of the broken drill rope in the course of withdrawal of the socket from the well casing, Figs. 8 and 9 are longitudinal sectional views of the socket showing the relative placement of the slip-wedge units at the lowermost limit of travel of the movable slip-wedge, Fig. 10 is a longitudinal sectional view of Fig. 9.

Figure 11:
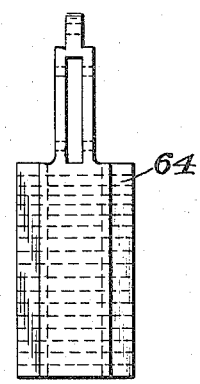
Figure 12:
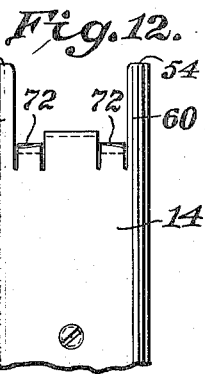
Figure 13:
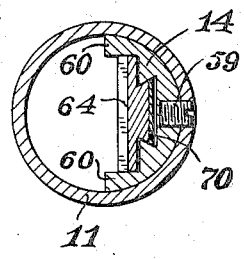

Fig. 11 is a rear elevation of a detail of Fig. 10, showing the rear face of the slidable wedge in the fixed unit shown in Fig. 9, Fig. 12 is a rear view of the upper portion of the slip-wedge unit shown in Fig. 9, Fig. 13 is a horizontal sectional view along line 13—13 of Fig. 10, Fig. 14 is a plan view of the latching collar, Fig. 15 is a front elevation thereof, Fig. 16 is a plan view of the spacing collar below the latching collar, Fig. 17 is a front elevation thereof, Fig. 18 is a plan view of the tripping collar, Fig. 19 is a front elevation thereof, Fig. 20 is a front elevation of a portion of the socket having a tool cooperating therewith for the purpose of releasing the broken drill rope from the slip-wedges subsequent to the raising of the socket from the well, Fig. 21 is a horizontal sectional view of the socket below the slip-wedges looking upward, showing the size of the opening for the passage of the broken drill rope when the movable slip-wedge is in its uppermost or set position (not appearing) and the slidable wedge of the fixed unit is also in its uppermost position, Fig. 22 is a similar view to Fig. 21 showing the size of the opening when the movable slip-wedge is in its lowermost position and the slidable wedge of the stationary unit still remains in its upper position.

In the drawings, Fig. 1 shows a fishing tool formed by a socket 11 attached to a head 10 and provided with a guiding tube 12 at the lower end thereof. Any desired equipment may be attached to the upper end of the head 10 such as a sinker rod. A collar 13' is threaded into the lower end of socket 11 at the threads 13, upon which collar is also threaded the guiding tube 12. The tube is slotted and flared at its lower end in order to pass tightly along the well casing, thereby to cause the broken drill rope to pass into the socket 11 with certainty.

The socket 11 contains the mechanism which is adjusted to such a position before lowering the tool into the well casing that it is tripped when its cooperating parts are in position for engaging the broken drill rope or rod which is sought to be extracted from the well casing. This mechanism includes a stationary slip-wedge unit 14 fixed upon the internal lateral wall of the socket for approximately half of the circumference thereof by such securing means as screws 59, (Fig. 10). A movable slip-wedge cooperates with the stationary unit and at the time of lowering the tool into the well casing it is disposed well above the stationary wedge. The movable slip-wedge 15 is connected with a control rod 16 extending upwardly in the socket and is attached at a lateral offset 17 with a collar 18 slidably disposed within the socket. A headed bolt 19 which may extend from the offset 17 maintains the control rod 16 in engagement with the collar 18.

A cup 20 may abut against collar 18, being rotatably disposed upon the bolt 19. Attached to a transverse bar 21 extending across the cup 20 is the lower end of a link chain 22 extending upwardly through the socket, terminating at its upper end in a gripping lug 23 which passes through an opening in the head 10. The lug 23 permits a pull to be exerted upon the chain, and upon the dropping of the latter fits within a groove in the head so as not to interfere with the movement of the head and socket within the well casing. A strong spring 24 is disposed upon the interior of the socket 11, extending between the head 10 and the seating collar 18 therefor, normally tending to maintain the control rod 16 and the slip-wedge 15 attached thereto in the lowermost position.

A latching collar 30 (Figs. 2, 3, 4, 5) is fixedly attached upon the interior of the socket 11 by means of screws 36. A small plunger 33 is disposed horizontally in the interior of this collar, urged normally to the left (Figs. 3, 4), by a spring 34 seated in one end thereof abutting against a capping screw 37 provided in the lateral wall of the collar. The latching collar is also provided with a longitudinal aperture 31 (Fig. 14) for the extension therethrough of a tripping cam 41, provided with a camming edge 41a. This collar is also provided with an opening 32 to permit the free travel of the control rod 16 therethrough. The tripping cam 41 is pivotally mounted upon the top of a tripping collar 40 (Figs. 3, 4, 18, 19) permitting a slight freedom of movement of the tripping cam 41 to exclude any binding effects. The collar 40 is maintained separated from the latching collar 30 by a spring 44 compressed between them. A transverse pin 43 is fixed upon the tripping cam 41 and cooperates with the upper face of collar 31, (Fig. 4) to limit the downward movement of the tripping collar 40. The latter may be formed at its bottom in the shape of a cup to receive the broken strands of the broken drill line R to effect the tripping operation. A spacing collar 50 is provided between the latching collar 30 and the tripping collar 40. A recess 51 in the spacing collar 50 and also 48 in the tripping collar 40 permit the upward and downward movements of the control rod 16 to take place.

As shown in Figs. 8 and 9, the movable slip-wedge 15 is provided with a series of serrations 55 which are adapted to come into grabbing engagement with the broken drill member upon the engagement of the latter by the two slip-wedges on the opposite sides thereof. Shoulders 56 upon slip-wedge 15 cooperate with the upper ends 54 of the sides 60 of the stationary slip-wedge unit 14 and serve to limit the downward movement of the movable slip-wedge.

A slidable wedge 64 forms part of the stationary slip-wedge unit which permits a relative movement to take place between the socket and the wedge units in the course of withdrawal of the fishing tool from the well casing, to obtain a most effective hold on the broken line, and also permits the release of the broken rod or rope from the jaws upon the withdrawal of the tool. A supplementary grab click 66 is provided at the top of the slidable wedge 64. A spring 69 permits a clockwise rocking of this grab click to allow the passage of the broken drill rope in the course of its relative upward travel through the socket. However, in a reverse direction it serves to execute an effective bite upon the broken drill rope, and it operates to supplement the grabbing action executed by the main wedge units.

The slidable wedge 64 may be controlled by the positioning of the tongue 68 pivotally attached to it at the point 67. Openings 78 in the tongue 68 cooperate with a longitudinal aperture 91 in the socket 11 to bring the slidable wedge 64 into its uppermost position on the fixed portion 14 whereupon it is stopped by the shoulders 72 at the upper end of 14. It is capable of movement in the fixed part 14 by a dovetail engagement between the back of 64 (Fig. 11) and guideways formed in 14. A spring plate 70 is disposed between the base 14 and the slidable wedge 64 to frictionally retain it in its adjusted position. A shoulder 71 is provided at the end of the guideways for limiting the downward movement of the slidable wedge 64.

The lower end of the slip-wedge 15 is provided with sharpened lugs 57 to engage the broken rod or rope in the event that the size thereof does not permit the serrated portion 55 to become effective.

The lower ends of both slip-wedges 14 and 15 are flared smoothly in order to guide the broken line into the socket without hindrance until it comes to abut against tripping collar 40 to trip the latching mechanism and thereby to effect a grabbing of the broken line by the cooperating action of the two slip-wedges. Fig. 21 shows the size of opening for the broken line past the fixed slip-wedge unit. Fig. 22 shows the relatively confined space when the movable slip-wedge is permitted to execute its complete traverse. This space may be further limited by the downward movement of the slidable wedge 64 (Figs. 9 and 10) towards the center of the socket.

In order to exclude the tripping of the movable slip-wedge from causes other than the pressing of the broken pipe line against collar 40, pressure relief ports 95 are distributed along the socket to permit any oil or other fluid matter to pass from the interior of socket before any appreciable pressures are developed.

The articulated tongue 68 jointed to the upper part of the slidable wedge 64 is shaped to conform to the interior of the socket and it offers no impediment to movement of the drill line within the socket. Its positioning is controlled from the exterior of the socket by a special two-armed tool 81, 82 (Fig. 20) adapted to engage in apertures 91, 92, respectively in the wall of the socket. With the end 80 of arm 82 as a fulcrum, a rotation of arm 82 in the direction of the arrow effects a raising of arm 81. Since arm 81 engages selectively the openings 78 in tongue 68, a raising of arm 81 effects an upward movement of sliding wedge 64. Thereby the wedge 64 is positioned at its upper limit of travel preparatory to the lowering of the socket into the well, and again when the socket is withdrawn from the well to release the hold of the slidable wedge 64 from the broken line.

My improved fishing tool operates in the following manner: The tool is set preparatory to lowering into a well by raising sliding wedge 64 to its upper position to allow maximum space for the passage of the broken line. Then chain 22 is pulled upwardly at its terminal lug 23, thereby compressing strong spring 22 and also raising control rod 16 with the slip-wedge 15 until the rod is latched by the engagement of plunger 33 with the recess 35. Upon lowering the tool into a well of any depth, the broken line is guided without hindrance into the lower end of the socket until a sufficient portion of the line is disposed between the movable and stationary slip-wedge units, whereupon the pressure thereof acting against the bottom collar 40 effects a raising of the cam bar, which finally trips the latch and permits the force of the spring 22 to drive wedge 15 downwardly as far as the broken line will permit, thereby grabbing the broken line between the two wedges. The shock attendant the tripping action is sufficient to notify the operator that the line is engaged and the withdrawal operation may be started. At the initiation of the withdrawal movement, sliding wedge 64 moves inwardly as far as the line permits to effect a supplemental grabbing action, which excludes the possibility of the line breaking loose. The biting action of the click 66 aids in this effect.

When the socket reaches the ground surface, tool 82 is manipulated to loosen preliminarily wedge 64 from the broken line, whereupon the broken line is withdrawn from the fishing tool.

It is understood that the tool described above may be made in any desired sizes for accommodating any range of pump lines.

While I have described my invention as embodied in concrete form and as operating in a specific manner for purposes of illustration, it should be understood that I do not limit my invention thereto, since various modifications will suggest themselves to those skilled in the art without departing from the spirit of my invention, the scope of which is set forth in the annexed claims.

What I claim is:

1. In a device of the class described, a hollow tubular socket adapted to be lowered into a well casing for extracting an object therefrom, a stationary slip-wedge unit fixed upon the inside wall of said socket, a slip-wedge reciprocable within said socket in a rectilinear direction and adapted to cooperate with said stationary unit near its lower limit of travel, resilient means normally tending to maintain said movable slip-wedge in cooperative relation with said stationary slip-wedge unit, means for latching said movable slip-wedge in a position above said stationary slip-wedge unit against the force of said resilient means, whereby the easy passage of the object into the bottom of said hollow socket is permitted, and means actuated by the entry of the object within the hollow socket for a predetermined extent for tripping said latching means, whereby said movable slip-wedge is forced downwardly in said rectilinear direction towards said stationary slip-wedge unit into gripping engagement with the object.

2. In a device of the class described, a hollow tubular socket adapted to be lowered into a well casing for extracting a broken line therefrom, a stationary slip-wedge unit fixed upon the inside wall of said socket, a slip-wedge reciprocable within said socket in a rectilinear direction and adapted to cooperate with said stationary unit near its lower limit of travel, resilient means normally tending to maintain said movable slip-wedge in cooperative relation with said stationary slip-wedge unit, means for latching said movable slip-wedge in a position above said stationary slip-wedge unit against the force of said resilient means, whereby the easy passage of the broken line into the bottom of said hollow socket is permitted, a tripping member within said tubular socket above said movable slip-wedge in its latched position, and means actuated by the broken line acting against said member for tripping said latching means, whereby said movable slip-wedge is forced downwardly in said rectilinear direction towards said stationary slip-wedge unit into gripping engagement with the broken line.

3. In a device of the class described, a hollow tubular socket adapted to be lowered into a well casing for extracting a broken line therefrom, a stationary slip-wedge unit fixed upon the inside wall of said socket, a slip-wedge reciprocable within said socket and adapted to cooperate with said stationary unit near its lower limit of travel, resilient means normally tending to maintain said movable slip-wedge in cooperative relation with said stationary slip-wedge unit, means for latching said movable slip-wedge in a position above said stationary slip-wedge unit against the force of said resilient means, whereby the easy passage of the broken line into the bottom of said hollow socket is permitted, means actuated by the entry of the broken line within the hollow socket for a predetermined extent for tripping said latching means, whereby said movable slip-wedge is forced downwardly towards said stationary slip-wedge unit into gripping engagement with the broken line, and means forming part of said stationary slip-wedge unit for effecting a supplemental gripping upon the broken line at the start of the raising movement of the hollow socket from the well casing.

4. In a device of the class described, a hollow tubular socket adapted to be lowered into a well casing for extracting a broken line therefrom, a stationary slip-wedge unit fixed upon the inside wall of said socket, a slip-wedge reciprocable within said socket and adapted to cooperate with said stationary unit near its lower limit of travel, resilient means normally tending to maintain said movable slip-wedge in cooperative relation with said stationary slip-wedge unit, means for latching said movable slip-wedge in a position above said stationary slip-wedge unit against the force of said resilient means, whereby the easy passage of the broken line into the bottom of said hollow socket is permitted, means actuated by the entry of the broken line within the hollow socket for a predetermined extent for tripping said latching means, whereby said movable slip-wedge is forced downwardly towards said stationary slip-wedge unit into gripping engagement with the broken line, and means forming part of said stationary slip-wedge unit for effecting a supplemental gripping upon the broken line at the start of the raising movement of the hollow socket from the well casing comprising a movable member slidable in inclined guideways, whereby relative movement between said socket and member effects a displacement of the member towards the center of the socket and the broken line engaged therein.

5. In a device of the class described, a hollow tubular socket adapted to be lowered into a well casing for extracting a broken line therefrom, a stationary slip-wedge unit fixed upon the inside wall of said socket, a slip-wedge reciprocable within said socket and adapted to cooperate with said stationary unit near its lower limit of travel, resilient means normally tending to maintain said movable slip-wedge in cooperative relation with said stationary slip-wedge unit, means for latching said movable slip-wedge in a position above said stationary slip-wedge unit against the force of said resilient means, whereby the easy passage of the broken line into the bottom of said hollow socket is permitted, means actuated by the entry of the broken line within the hollow socket for a predetermined extent for tripping said latching means, whereby said movable slip-wedge is forced downwardly towards said stationary slip-wedge unit into gripping engagement with the broken line, and means forming part of said stationary slip-wedge unit for effecting a supplemental gripping upon the broken line at the start of the raising movement of the hollow socket from the well casing comprising a movable member slidable in inclined guideways, whereby relative movement between said socket and member effects a displacement of the member towards the center of the socket and the broken line engaged therein, and a pivoted click at the upper end of said last-mentioned movable member for biting into the broken line.

6. In a device of the class described, a hollow tubular socket adapted to be lowered into a well casing for extracting a broken line therefrom, a stationary slip-wedge unit fixed upon the inside wall of said socket near the lower end thereof, a movable slip-wedge mounted for reciprocating movement within said socket for cooperation with said stationary unit near its lower limit of travel, a spring at the upper end of said socket and a seating member therefor, a control rod extending between said member and said movable slip-wedge, said spring in its extended position tending to maintain said movable slip-wedge in cooperative relation with said stationary slip-wedge unit, manipulative means for compressing said spring and raising said movable slip-wedge, means for automatically latching said control rod at a predetermined point of compression of said spring, and means actuated by the entry of the broken line within the hollow socket for a predetermined extent for tripping said latching means, whereby said movable slip-wedge is forced downwardly towards said stationary slip-wedge unit into gripping engagement with the broken line.

7. In a device of the class described, a hollow tubular socket adapted to be lowered into a well casing for extracting a broken line therefrom; a stationary slip-wedge unit fixed upon the inside wall of said socket near the lower end thereof; a movable slip-wedge mounted for reciprocating movement within said socket for cooperation with said stationary unit near its lower limit of travel; a spring at the upper end of said socket and a seating member therefor; a control rod extending between said member and said movable slip-wedge, said spring in its extended position tending to maintain said movable slip-wedge in cooperative relation with said stationary slip-wedge unit; manipulative means for compressing said spring and raising said movable slip-wedge; means for automatically latching said control rod at a predetermined point of compression of said spring comprising a latching collar fixedly disposed upon the interior of the socket below said seating member, a recess in said control rod, and a spring pressed catch member movable in said collar adapted to engage said recess in said control rod when said recess comes into alignment therewith; and means actuated by the entry of the broken line within the hollow socket for a predetermined extent for tripping said latching means whereby said movable slip-wedge is forced downwardly towards said stationary slip-wedge unit into gripping engagement with the broken line.

8. In a device of the class described, a hollow tubular socket adapted to be lowered into a well casing for extracting a broken line therefrom; a stationary slip-wedge unit fixed upon the inside wall of said socket near the lower end thereof; a movable slip-wedge mounted for reciprocating movement within said socket for cooperation with said stationary unit near its lower limit of travel; a spring at the upper end of said socket and a seating member therefor; a control rod extending between said member and said movable slip-wedge; said spring in its extended position tending to maintain said movable slip-wedge in cooperative relation with said stationary slip-wedge unit; manipulative means for compressing said spring and raising said movable slip-wedge; means for automatically latching said control rod at a predetermined point of compression of said spring comprising a latching collar fixedly disposed upon the interior of the socket below said seating member, a recess in said control rod, and a spring-pressed catch member movable in said collar adapted to engage said recess in said control rod when said recess comes into alignment therewith; and means actuated by the entry of the broken line within the hollow socket for a predetermined extent for tripping said latching means whereby said movable slip-wedge is forced downwardly towards said stationary slip-wedge unit into gripping engagement with the broken line comprising a tripping collar movably mounted within said socket below said latching collar, a cam bar extending upwardly from said tripping collar through openings in said latching collar and said catch member, and resilient means normally tending to maintain said tripping collar separated from said latching collar, the pressure of the broken line against the tripping collar adapted to act against the force of said resilient means to bring into effect the camming action of said cam bar against said catch member to effect the release of said control rod.

9. In a device of the class described, a hollow tubular socket adapted to be lowered into a well casing for extracting a broken line therefrom; a stationary slip-wedge unit fixed upon the inside wall of said socket near the lower end thereof; a movable slip-wedge mounted for reciprocating movement within said socket for cooperation with said stationary unit near its lower limit of travel, a spring at the upper end of said socket and a seating member therefor; a control rod extending between said member and said movable slip-wedge; said spring in its extended position tending to maintain said movable slip-wedge in cooperative relation with said stationary slip-wedge unit; manipulative means for compressing said spring and raising said movable slip-wedge; means for automatically latching said control rod at a predetermined point of compression of said spring comprising a latching collar fixedly disposed upon the interior of the socket below said seating member, a recess in said control rod, and a spring-pressed catch member movable in said collar adapted to engage said recess in said control rod when said recess comes into alignment therewith; and means actuated by the entry of the broken line within the hollow socket for a predetermined extent for tripping said latching means whereby said movable slip-wedge is forced downwardly towards said stationary slip-wedge unit into gripping engagement with the broken line comprising a tripping collar movably mounted within said socket below said latching collar, a cam bar extending upwardly from said tripping collar through openings in said latching collar and said catch member, and resilient means normally tending to maintain said tripping collar separated from said latching collar, the pressure of the broken line against the tripping collar adapted to act against the force of said resilient means to bring into effect the camming action of said cam bar against said catch member to effect the release of said control rod; a stop at the upper end of said cam bar cooperating with the upper face of said latching collar for limiting the separating movement between said two collars; and a spacing element intermediate said two collars for limiting the approaching movement between said two collars.

10. In the combination of a fishing tool for broken lines, a tubular socket, a slip-wedge unit adapted to be fixedly mounted upon the interior of said socket, and a slidable member forming part of said unit adapted to be controlled by the relative movement in one direction of the socket and the broken line and also from the exterior of said socket.

11. A slip-wedge unit having a base portion, guideways in said base, a serrated wedge slidable in said guideways, resilient means intermediate said base portion and said wedge adapted to frictionally retain said wedge in adjusted position, a click member pivotally mounted at the upper end of said slidable wedge, and means associated with said member permitting pivotal movement in one direction only.

12. A slip-wedge unit having a base portion, guideways in said base, a serrated wedge slidable in said guideways, resilient means intermediate said base portion and said wedge adapted to frictionally retain said wedge in adjusted position, a member jointed to the upper end of said slidable wedge, said member adapted to be controlled by manipulative means to adjust the positioning of said slidable wedge.

JOHN B. TUSTIN.